April 16, 1963 — A. J. SLEMMONS — 3,085,386
ROTARY LAWNMOWER
Filed Feb. 16, 1960 — 5 Sheets-Sheet 1
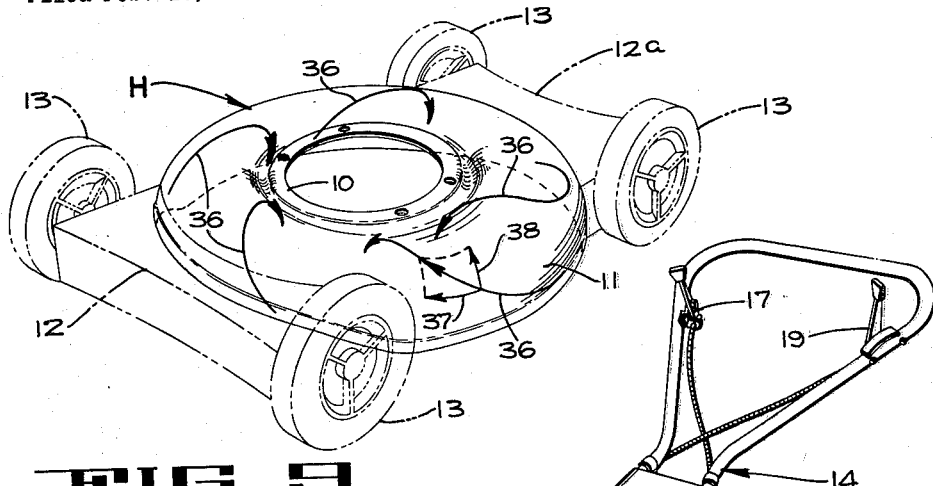
FIG_9
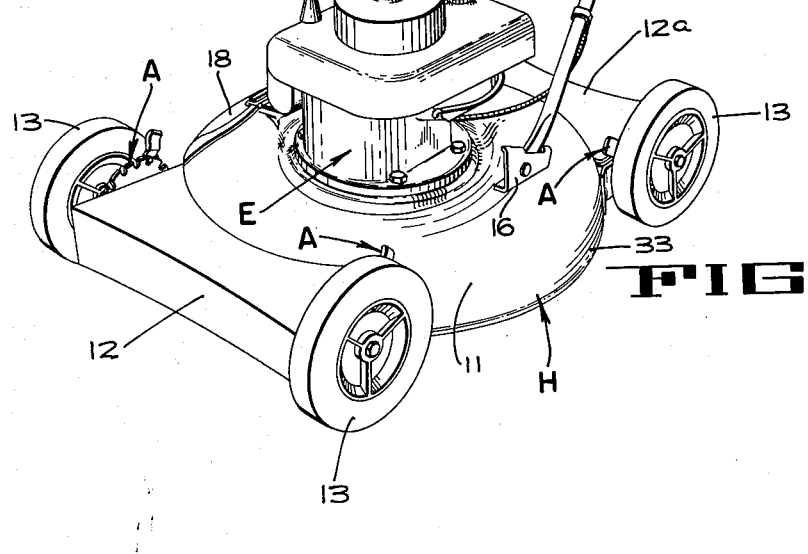
FIG_1
INVENTOR
ARTHUR J. SLEMMONS
BY *Hans G. Hoffmeister*
ATTORNEY

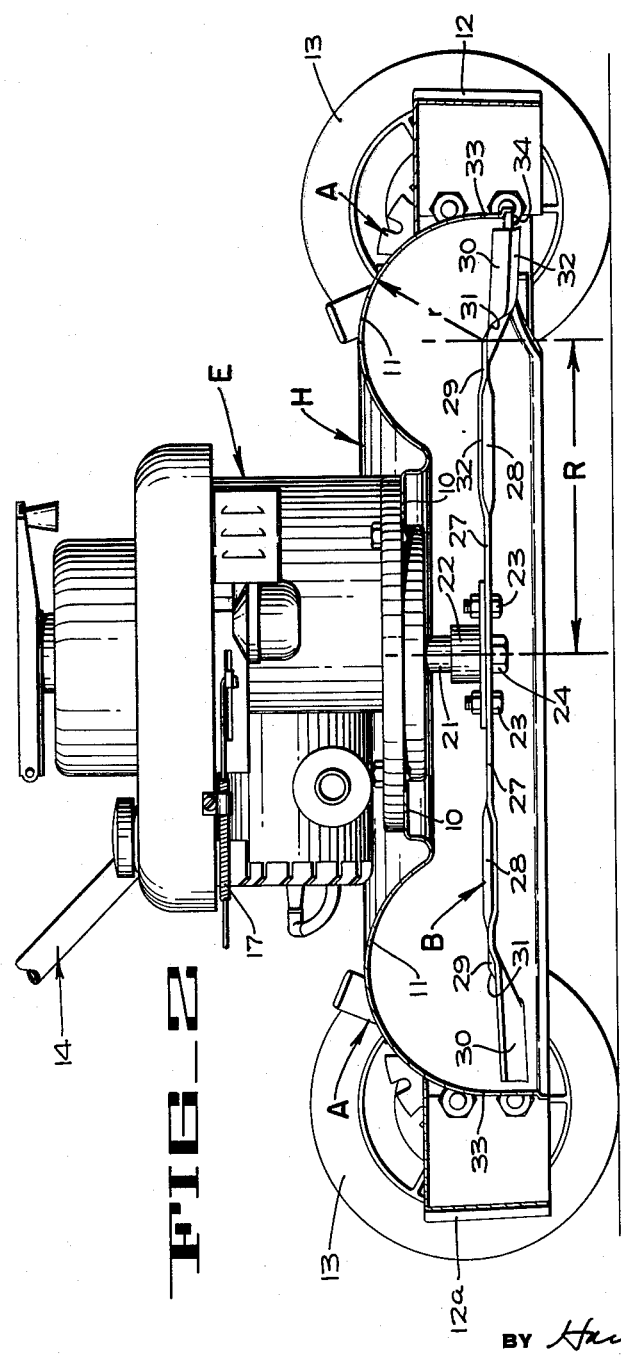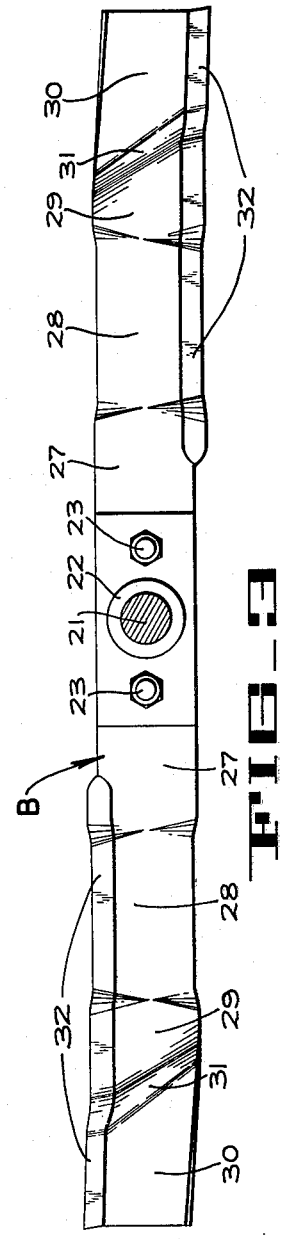

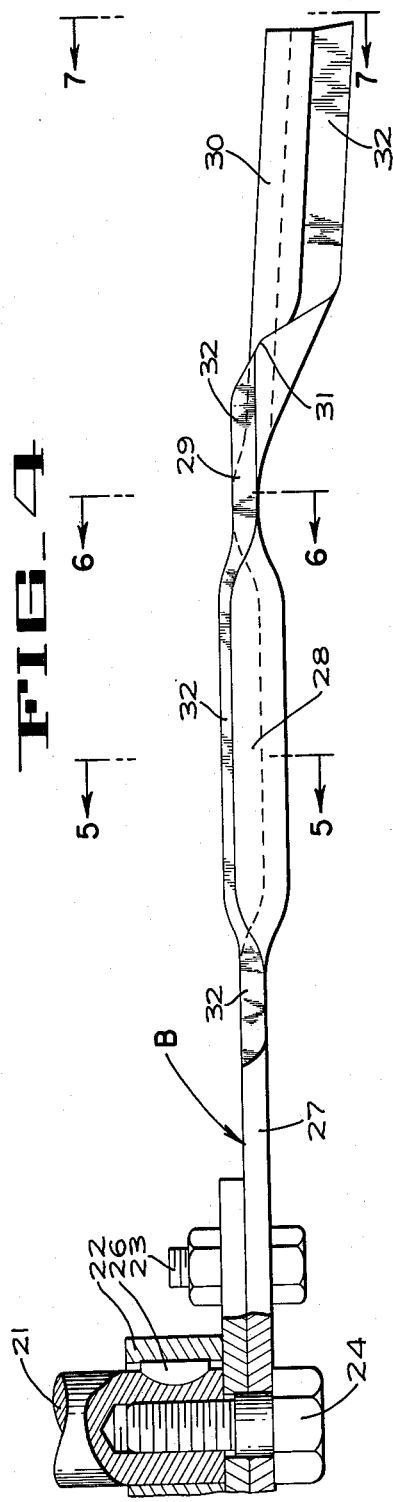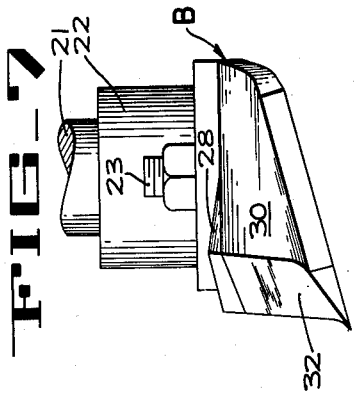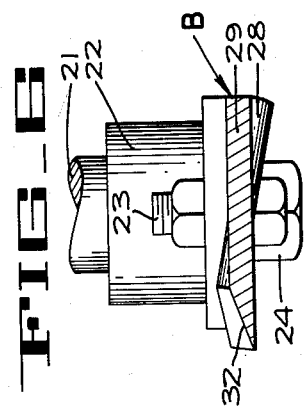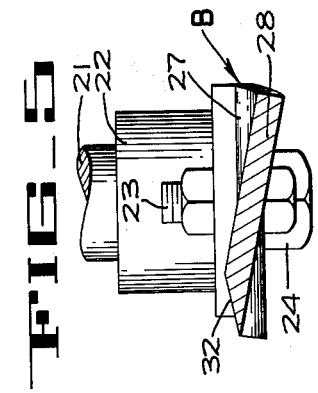

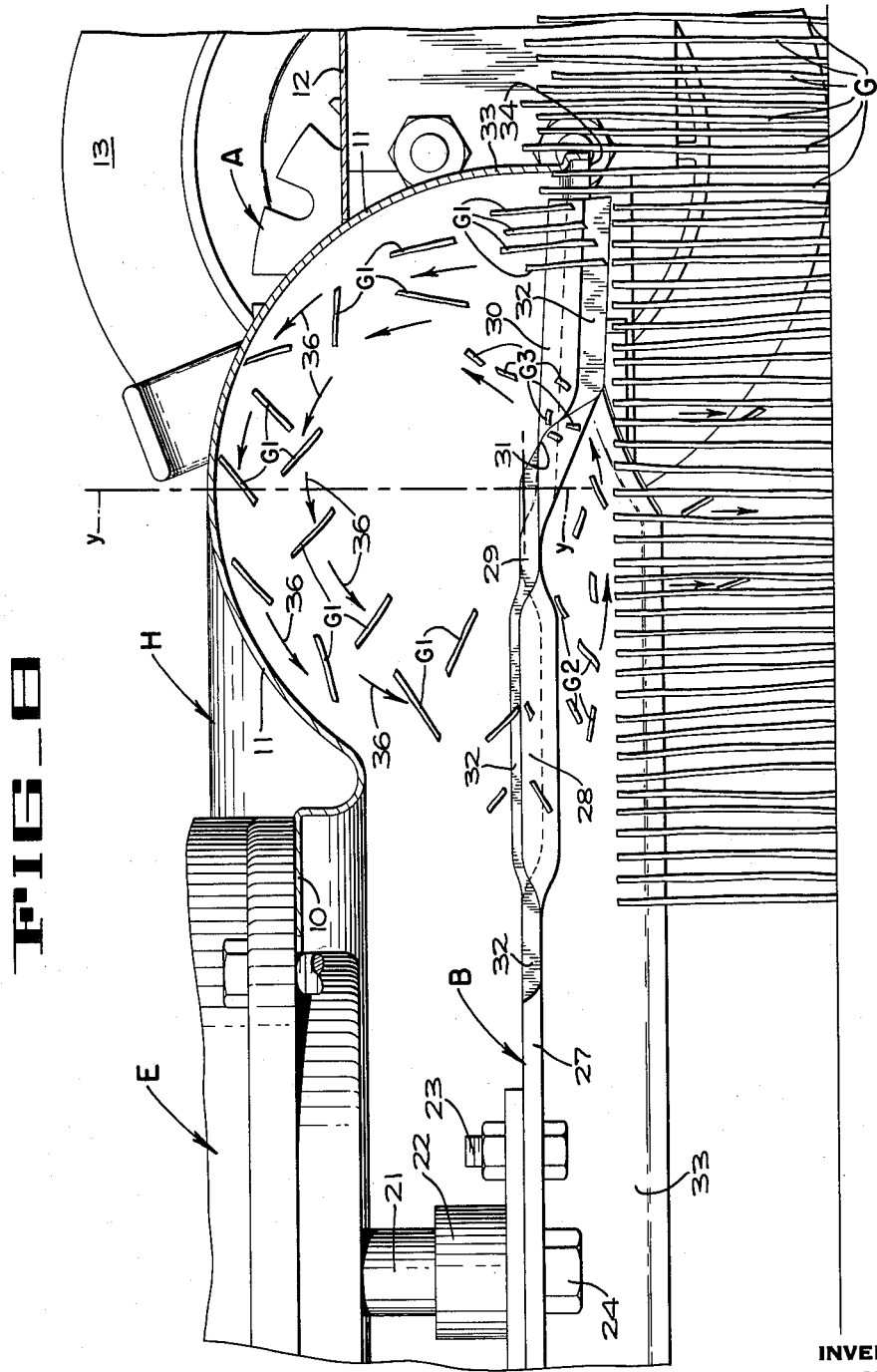

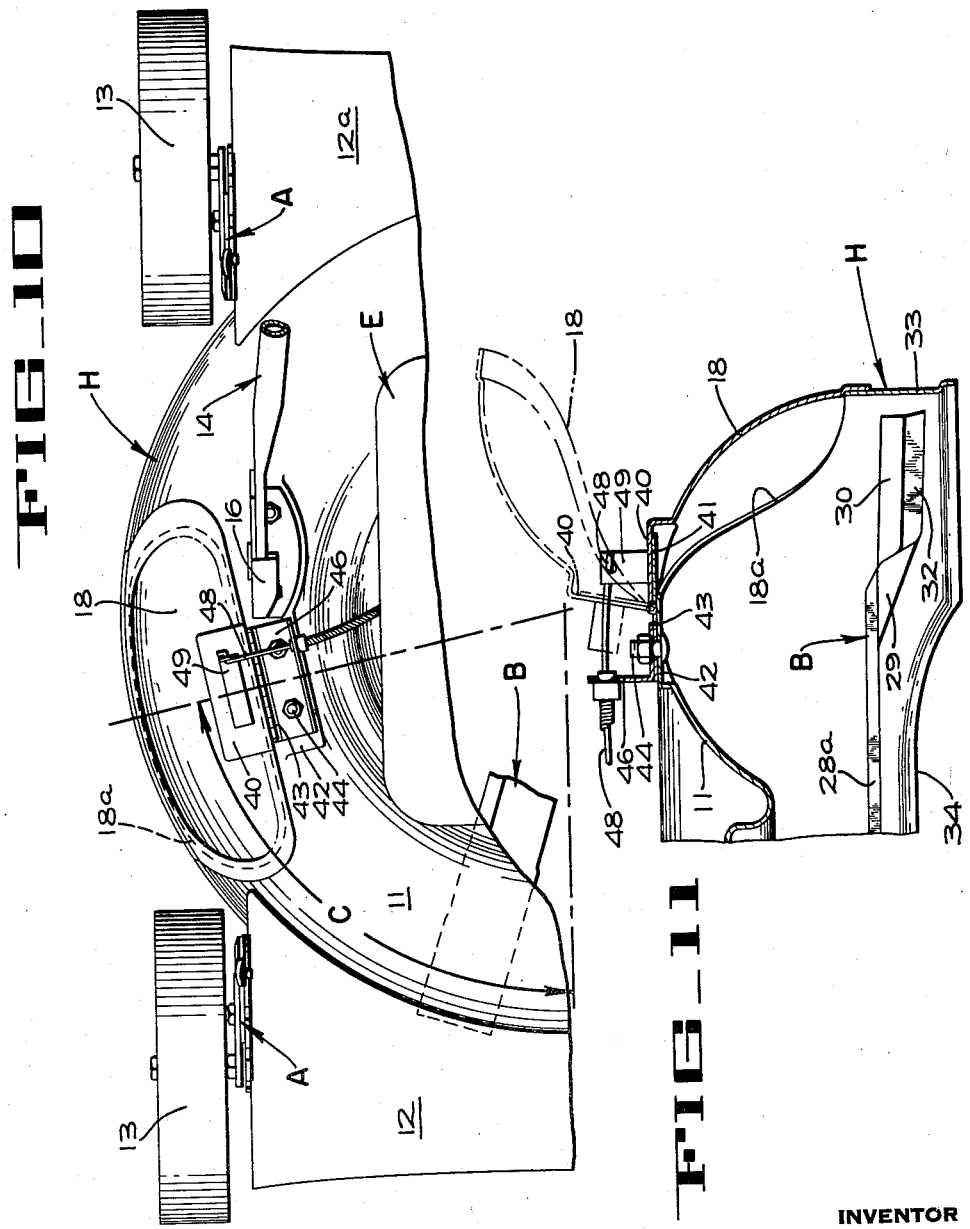

United States Patent Office 3,085,386
Patented Apr. 16, 1963

3,085,386
ROTARY LAWNMOWER
Arthur J. Slemmons, Los Gatos, Calif., assignor to FMC Corporation, a corporation of Delaware
Filed Feb. 16, 1960, Ser. No. 9,040
6 Claims. (Cl. 56—25.4)

This invention relates to rotary lawnmowers and more particularly to an improved rotary lawnmower housing and to a blade and housing combination.

The rotary lawnmower of the type to which this invention relates is that wherein the cutting element is in the form of a narrow and elongated, or ribbon type blade having forwardly facing sharpened edges. The blade is rotated at high speed by suitable motor means, such as an internal combustion engine. Such mowers also include a housing that surrounds the rotating blade. Although rotary mowers of this type have come into wide use, previous machines have left much to be desired. One of the characteristics of prior mowers of the type to which this invention relates is that of uneven distribution of the cut grass clippings on the terrain. Such uneven distribution results in an unsightly lawn, frequently to the extent that it requires raking or gathering of the cut material in order to improve the appearance of the mowed lawn. In addition to the unnecessary labor involved, such raking deprives the lawn of the nutrient and mulching value of the cut material.

Another problem presented by prior power motors of the type which this invention relates is that of a depositing and packing of cut material on the under surface of the mower housing. This problem is aggravated by the presence of excess moisture that occurs when a lawn is cut when damp. A heavy deposit of cut material on the housing tends to choke up the action of the cutting blade, which in addition to merely cutting the lawn must then drag the cut material across the deposit previously formed on the housing. The deposit often falls off the housing and is thrown out of the discharge opening in clumps. Furthermore, such deposit of material often causes the engine to stall, makes starting of the mower difficult, and the deposited material becomes rancid and offensive and causes corroding of the mower housing, unless the packed material is removed during and after each use of the machine.

The primary cutting action in mowers of the type to which this invention relates occurs adjacent the tip ends of the blade. The cut material has imparted thereto a tangential momentum with the result that it is thrown against the lower peripheral portion of the housing, where packing occurs. It has been proposed to incline the tip packing ends of the blade to impart a lifting action to the grass so that the grass will stand up and will be more uniformly cut, but unless the housing is formed according to the principles of this invention, the lifting action merely aggravates the problem of depositing material. In prior fan type blade mowers, not only is the material flung radially outward against the lower peripheral portion of the housing but it is lifted and is compacted on the upper portion of the housing so that the clogging problems largely resulting from the design of prior mower housings are still present. If the interior surface of the housing has any sharp corners or is otherwise arranged to provide velocity changes in the stream of air set in motion by the rapidly rotating blade, the cut material tends to compact and build up in resulting low pressure areas. Likewise, the use of a housing wherein the cross sectional area of the housing changes either non-uniformly or progressively, or the involute type housing wherein the housing radius becomes progressively larger towards an exit throat, results in air pressure variations. These factors contribute to non-uniform disposal of the cut material, with a corresponding deposit and packing of the cut material on the housing. In involute housings, the discharge throat becomes clogged, which reduces the intended scattering effect of the involute housing and throat arrangement.

Objects of the present invention are to provide an improved and more even distribution of the cut material over the surface of the lawn, to re-cut the material after initial trimming so as to reduce it to a fine mulch, and to obviate raking.

Another object of the invention is to reduce or virtually eliminate the depositing and compacting of the cut material on the inner surface of the housing, so that the housing remains relatively clean during operation.

In a mower constructed in accordance with this invention, these objects and advantages are provided by an improved housing and an improved blade and housing inter-action. First, the housing itself has an inner surface of semitoroidal form. That is, the inner surface of the housing is generated by a generatrix which is substantially in the form of a semicircle, this generatrix being revolved about the major housing axis, which is also the axis of blade rotation. All vertical sections taken radially of the housing are the same, except for a forward portion at which the lower edge of the housing skirt is relieved somewhat to facilitate entry of the grass into the housing. The internal surface of the housing is smooth and regular, it has no internal corners or obstructions and, being uniform in section, provides no zones wherein air velocity or the velocity of cut material either increases or decreases due to housing shape. As a result, the housing does not induce material to drop out before being mulched, nor does it induce compacting of cut material. The regular, smooth semitoroidal shape also provides for the most efficient circulation of air set in motion by the blade.

The blade is specifically shaped and dimensioned to cooperate with its housing. The majority of the outer peripheral half of the housing, that is the portion radially outward of the path of the center of the generatrix of the housing surface, is swept by cutting blade tip or end portions, which in addition to having forwardly sharpened cutting edges are inclined upwardly in a direction contrary to that of the blade rotation. The intermediate portions of the blade, that is the portions within the inner peripheral half of the housing, are also forwardly sharpened. The relative dimensions of the housing and the blade are such that the intermediate blade portions re-cut material that were originally severed by the end portions of the cutting blade, and circulated around the housing. This provides even distribution, a good mulch, and a scrubbing action that virtually eliminates packing of cut material within the housing.

In accordance with this invention the dimensions of the housing and of the blade are carefully selected to produce the aforesaid mode of operation and improved results. The combined cutting and lifting blade portions at the ends of the blade, and the intermediate re-cutting portions, lie respectively within the outer and inner peripheral halves of the housing, as described. However, if the inner confines of the housing are too close to the axis of rotation of the blade, then the peripheral speed of said intermediate portions of the blade will not be high enough to perform an effective re-cutting and mulching action. Likewise, if the radius of the generatrix of the semitoroidal section of the housing, is in itself too small, the housing will tend to become filled with cut material. In accordance with the invention, by properly selecting the radius of the generatrix and the radius of its path about the center of the housing, optimum results are obtained, which solve the problems and reduce the difficulties described.

A mower constructed in accordance with this invention has the following mode of operation: the upwardly inclined ends of the blade that lie within the outer peripheral half of the housing, not only cut the grass but impart to the cuttings both a tangential velocity and a vertical velocity. The resultant of these velocities is such that the cut material is lifted and deflected around the housing in an inwardly spiral direction. The cut material continues to move around the housing and down the inner peripheral half of the housing, whereupon it is brought into the path of the sharpened intermediate portions of the blade. Here this deflected material is re-cut and the particles tend to drop out and mulch the lawn. There is also a tendency for the air to circulate underneath the blade, which further improves its circulation and spreading action on cut material.

Since the internal surface of the housing is of uniform, regular cross-sectional shape, this action occurs completely around its periphery, although when moving forward the grass will be initially cut in the front portion of the housing. The deflecting action on the cut material around the housing is such that the material does not deposit and pack up on the housing, but in fact scrubs the housing clean, as the lawn is cut.

In the embodiment of the invention illustrated, an additional important feature is incorporated in the blade. The intermediate portions of the blade, that is those that sweep past the inner peripheral half of the housing, in addition to be forwardly sharpened, are inclined downwardly in the direction contrary to that of blade rotation. This generates an air motion over the inner peripheral half of the semitoroidal portion 11 of the housing which continues the previously imparted downwardly directed air motion and motion of the cut material, and insures that such material will be drawn into the path of the mulching sections of the blade to be re-cut. The result of this blade and housing arrangement is to provide a very effective grass circulating and re-cutting action, which not only prevents compacting of the cut grass on the housing, but provides an efficient second or third cutting action, effective mulching action, and even distribution of the mulched material. No raking is required and the inherent nutrient and mulching effects of the cut grass are not lost.

Another object of the invention is to scatter or broadcast the cut material if desired, or to make possible the collection of the cut material in a bag. To this effect a generally oval opening is formed in the outer peripheral half of the housing wall, which opening can be closed by a remotely operated hinged door. The opening is advanced in the direction of blade rotation, from the front of the housing by an angle somewhat less than 90°. This positions the opening so that it will efficiently discharge cut material that is lifted and deflected by the ends of the blade, for either scattering or collecting. The smooth toroidal shape of the housing contributes to the effectiveness of the opening, because even if freshly cut material is not ejected the first time, since the mower recirculates and re-cuts the material after initial cutting, a very high percentage of cut material is ejected in a finely cut condition. In other words, the re-circulation action described continues, even when the door is open. As a result, when the cut material is ejected, it is in such a finely cut or pulverized condition, that if a collecting bag is employed, the bag need not be emptied as often as it would if it had received coarsely cut material.

These and other objects and advantages of the present invention will become apparent from the following description and the accompanying drawings in which:

FIG. 1 is a perspective of a mower of the invention.

FIG. 2 is a vertical medial section through the mower housing.

FIG. 3 is a plan of the blade employed in the mower of FIGS. 1 and 2.

FIG. 4 is a fragmentary edge elevation of the blade.

FIGS. 5 and 6 are sections of the blade taken along lines 5—5 and 6—6, respectively, of FIG. 4.

FIG. 7 is an end view of the blade looking in the direction of arrows 7—7 of FIG. 4.

FIG. 8 is a view of one half of the blade and housing assembly, showing diagrammatically the action of the blade.

FIG. 9 is a diagrammatic simplified perspective of the mower housing, with arrows drawn thereon indicating the action of the blade upon cut material.

FIG. 10 is a fragmentary plan of the mower showing the discharge door, and

FIG. 11 is a fragmentary section at the discharge door, illustrating a modified form of the rotary blade.

Referring to FIGS. 1 and 2, the main frame of the mower is in a form of a generally semitoroidal housing H, having a flat central portion 10 to which an internal combustion engine E is bolted. The semitoroidal portion 11 of the housing has an internal surface that is generated by a generally semicircular generatrix when the generatrix is rotated about the vertical major or blade axis of the housing. A front apron 12 and a rear apron 12a are attached to the housing and wheels 13 are mounted on the aprons. Suitable height adjustment mechanism A is provided for raising or lowering the wheels, to adjust the cut of the mower. A handle assembly 14 is mounted on the housing by brackets 16, and a throttle control 17 terminates at the upper portion of the handle. As also seen in FIGS. 10 and 11, a door 18 may provide for closing an aperture 18a formed in one side wall of the housing, which door may be opened or closed by a control 19 on the handle, as will be described in more detail presently. The aperture 18a is provided for discharging cut material which may be collected in a bag if desired. The structure and mounting of the bag form no part of the present invention and are illustrated and described in application Serial No. 58,602, filed Sept. 22, 1960.

As seen in FIGS. 2 and 4, the engine shaft 21 mounts a rotary blade B. The blade is bolted to a hub member 22 by means of bolts 23. The hub member slips over the end of engine shaft 21, and is retained in place by a central bolt 24. A driving key 26 is provided (FIG. 4) between the hub and the engine shaft 21. The blade is rotationally symmetrical about the axis of its drive shaft 21.

Details of the blade construction are best seen in FIGS. 3–7. The blade is pressed or forged from a flat spring steel strip. The blade has a flat central portion indicated generally at 27, to which the hub 22 is bolted. Extending from the flat central portion of the blade are what will be termed intermediate blade portions 28, which are inclined downwardly in the direction contrary to that of blade rotation, by an angle of approximately 10°. Radially outward of the intermediate portions 28 of the blade are transitional portions 29, from which extend end portions 30. End portions 30 are inclined upwardly in the direction contrary to that of blade rotation by an angle of approximately 16°. There are also transitional bends 31 between the end portions 30 of the blade and the intermediate portions 29. The sections of FIGS. 5 and 6 and the end view FIG. 7 show the relationship of intermediate portions 28, transitional portions 29, and end portions 30 to the hub 22 and to the flat central portion 27 of the blade. As best seen in FIG. 3, the majority of the blade is forwardly sharpened at 32.

As seen in FIGS. 2 and 11 a skirt 33 of the housing is relieved somewhat at the front, as at 34, so that the housing will not unduly deflect the grass before it can be cut by the blade, during forward advance of the mower over the lawn.

The geometry of the housing H relative to the construction of the blade plays an important part in the invention. As seen in FIG. 2, the semitoroidal portion 11 of the housing H has a generatrix in the form of a semicircle of radius $r$. The center of the generatrix is displaced from the axis of rotation of the blade, which corresponds to the major axis of the housing, by a radius R. In other words, R is the radius of the path of the center of the generatrix. The inclined tip portions 30 of the blade sweep under the major part of the outer peripheral half of semitoroidal portion 11. The intermediate portions 28 of the blade sweep under the major part of the inner peripheral half of the semitoroidal portion of the housing.

The intermediate blade portions 28 perform a recutting and mulching action on material initially cut by the end portions 30 of the blade. This requires that the intermediate portions 28 revolve at peripheral speed sufficient for them to have an effective cutting action. These requirements in turn require that the radius $r$ (FIG. 2) of the generatrix of the semitoroidal 11, and the radius R of the path of the generatrix have substantially a certain ratio. It has been found that the most effective ratio of $R/r$, is substantially one of 2.5. If the radius $r$ of the generatrix is too small relative to R, then the housing tends to be filled, clogged or packed with cut material. On the other hand, if radius $r$ of the generatrix is too large relative to the radius R of its path, then the radially inner side of the housing will lie too close to the axis of blade rotation. In such a design the peripheral speed of the intermediate blade portions 28 will not be high enough to attain an effective re-cutting and mulching action. I have found that for most effective operation the ratio of $R/r$ should lie within the range of 2 to 4.

To give a typical set of dimensions: In a mower having a blade that is 22" long from end to end, radius R will be approximately 8¼" and radius $r$ will be approximately 3¼", giving a ratio $R/r$ of slightly over 2.5. These dimensions provide freedom from packing coupled with adequate re-cutting by the intermediate blade portions. The lengths of the forwardly sharpened, effective cutting portions of inclined blade ends 30, will be approximately 1⅝".

It will be noted from FIG. 8 that all portions of the effective cutting edges of the inclined end portions 30 of the blade lie outside the circular path of the axis $y—y$ that represents a vertical line through the center of the generatrix.

This circular path of the axis $y—y$ will hereinafter be termed the path of the generatrix itself, and since the entire effective cutting portions of the blade lie outside this circular path, cut material that is lifted by the blade strikes the housing at an acute angle and hence the material is deflected along the housing. If the effective cutting edges of end portions 30 of the blade extended to or nearly to the axis $y—y$, material cut at that axis would strike the housing at an angle at or near 90°, and such material would not be deflected around the housing as illustrated and described. In the mower described, approximately the inner one third of the outer peripheral half of the semitoroidal part 11 of the housing (that is, the one-third closest to the axis $y—y$) is not swept by an effective cutting portion of inclined blade ends 30, so that cut material is not lifted vertically directly against the substantially horizontal midpart of the semitorodial portion 11 of the housing.

Although the majority of the semitoroidal portion 11 is substantially semicircular in section, as previously mentioned the outer wall is extended somewhat by the substantially vertical skirt 33 which surrounds the end of the blade, and acts as a guard. As previously mentioned, the skirt is relieved at 34 at the forward portion of the housing so that the grass will not be deflected unduly before the blade can strike it, when the mower is moving ahead.

The combined cutting, re-cutting, and mulching action of a mower of this invention is illustrated diagrammatically in FIGS. 8 and 9. The inclined end portions 30 of the blade cut the uncut grass G into lengths G1, as illustrated diagrammatically in FIG. 8. Since the blade ends 30 are inclined upwardly in the direction contrary to that of blade rotation, the cut material G1 is given a compound motion, as indicated by the arrows 36, these arrows being shown three dimensionally in FIG. 9. The tangential component of the motion is indicated by arrow 37, and the vertical component is indicated by the arrow 38. The internal surface of the housing deflects the rapidly moving cut material as it is flung from the ends 30 of the blades, causing the material to move upward around and down the internal surface of the housing. Likewise the end portions 30 of the blade act as a fan and impart corresponding motion to the air. This action occurs to an apreciable extent entirely around the housing as indicated in FIG. 9.

The paths 36 of the cut material and of the air are shown three-dimensionally in FIG. 9, and are also generally indicated by the arrows 36 (in a foreshortened manner) in FIG. 8, which figure further indicates the cutting and recirculating action. The cut lengths G1 are deflected downwardly into the path of the intermediate blade portions 28, as seen in FIG. 8. When this occurs the lengths of cut material G1 are re-cut into smaller bits G2, and some of them are spread evenly as a mulch upon the terrain. Some pieces G2 of the cut material are drawn back toward the bend portions 31 of the blade, to be further re-cut into lengths G3. This re-cutting and mulching action is augmented by the intermediate portions 28 of the blade, where they are inclined downwardly in the direction contrary to that of blade rotation. These provide a reverse fan action that draws the cut material downwardly around the inner peripheral half of the housing and into the path of the intermediate sharpened edges of the intermediate blade portions 28. The cut material tends to move along but not adhere to the inner surface of the housing. This largely eliminates the compacting and gathering of cut material on the housing wall, and reduces tendency of the engine to stall in heavy going.

In the broader aspects of the invention the intermediate portions 28 of the blade need only be sharpened and need not be inclined, as illustrated at 28a, FIG. 11. Under these circumstances the intermediate portions will perform a re-cutting action because the velocity imparted to the cut material and to the air by the end portions 30 of the blade, will insure that at least some of the cut material will be deflected downwardly around the inner peripheral half of the semitoroidal portion 11 of the housing and into the path of the intermediate portions 28a, which will re-cut the grass as before. However, the inclination of the intermediate portions as described augments this circulating action thereby increasing the efficiency of the mower.

Referring to FIGS. 10 and 11, the discharge door arrangement is formed to provide a minimum interference with material and air circulation. The door 18 corresponds to the housing contour and merges with it smoothly. The door 18 extends over the discharge opening 18a, which occupies the outer peripheral half of the semitoroidal portion 11 of the housing in the principal region where material is being flung from the ends 30 of the blade. As seen in FIG. 10, the center of the door is positioned circumferentially on the housing at an angle C of about 78°, as measured from the forward mid-point of the housing. This places the opening at the last portion of the first quadrant that is swept by the rotating blade after passing through the zone where the major part of the cutting operation occurs. This position results in most effective discharge of cut material during normal operation. The opening 18a is oval and subtends an angle of about 45°, as in FIG. 10.

In order to mount the door 18 for hinged movement, a small section of the upper portion of the door 18 is flattened or embossed slightly at 40. A hinge leaf 41 is welded to the underside of flattened portion 40. The housing portion 11 is also embossed slightly at 42 and the other hinge leaf 43 is mounted thereon by bolts 44. These bolts also mount an angle bracket 46, to which is secured the flexible guiding sheath for a control wire 48. The end of wire 48 connects to an angle bracket 49 welded on top of the embossment 40 over-lying the cover hinge leaf 41. Wire 48 connects to the handle control 19 (FIG. 1), for remote opening of the door, to discharge cut material externally of the housing as described. The degree of door opening can also be controlled. This arrangement preserves the essentially smooth internal configuration of the inner semitoroidal surface of the housing, so that when the door 18 is closed, the circulating and re-cutting action described is not impeded, and cut material does not pack at the door. The door 18 is so shaped that when it closes the opening 18a in the housing it forms substantially a continuation of the housing. When the door is fully opened, as indicated in broken lines in FIG. 11, it deflects cut material emerging from the housing horizontally outward where it may be collected by a bag, as described in aforesaid co-pending application Serial No. 58,602. Intermediate door positions will deflect the grass both outward and downward, for scattering.

The generatrix of the semitoroidal portion 11 of the housing has been described as being substantially a semicircle, having a radius r. This produces a smooth, regular semitoroidal housing. In practice other conic sections may form the generatrix. For example, a semi-ellipse, a parabola, or one leg of a hyperbola may form the generatrix. The only requirement is that the curve of the generatrix be neither too deep nor too shallow. In other words, the radius of curvature of the generatrix should not vary too greatly, so that the curve resembles a semicircle in function and mode of operation. Accordingly, I contemplate that the terms "semicircular" or "semicircle," as used in the appended claims, include these functionally equivalent forms of generatrix curve.

While a particular embodiment of the present invention has been shown and described it will be understood that the mower is capable of modification and variation without departing from the principles of the invention and that the scope of the invention should be limited only by the scope and proper interpretation of the claims appended hereto.

The invention having thus been described that which is claimed as new and which is desired to be protected by Letters Patent is:

1. A combined material cutting and mulching mowing machine comprising a housing having a smooth, regular semitoroidal internal surface, a blade, means mounting said blade for rotation about the major housing axis, and means for rotating said blade, said blade having forwardly sharpened end portions inclining upward in a direction contrary to the direction of blade rotation, said upwardly inclining end portions of the blade lying within the outer peripheral half of the internal surface of the housing, the effective cutting lengths of the upwardly inclining end portions of said blade lying outside the circular path of the generatrix of said semitoroidal surface of the housing, said forwardly sharpened upwardly inclining end portions of the blade cutting the material and imparting both a tangential and an upward velocity to the cut material, said housing deflecting the cut material around its internal surface, said blade having intermediate portions lying at least partly within the inner peripheral half of said internal surface of the housing, said intermediate portions of the blade inclining downward in a direction contrary to that of blade rotation for drawing cut material downward from the inner portion of said internal surface of said housing and into the path of the intermediate blade portions, said intermediate blade portions being forwardly sharpened for further cutting the cut material and mulching the terrain.

2. A combined material cutting and mulching mowing machine comprising a housing having a smooth, regular semitoroidal internal surface, a blade, means mounting said blade for rotation about the major housing axis, and means for rotating said blade, said blade having forwardly sharpened end portions inclining upward in a direction contrary to the direction of blade rotation, said upwardly inclining end portions of the blade lying within the outer peripheral half of said internal surface of the housing, the effective cutting lengths of the upwardly inclining end portions of said blade lying outside the circular path of the generatrix of said semitoroidal surface of the housing, the radially inner margins of said end portions being spaced from said path by a distance that is not substantially less than one third the radius of the generatrix of said surface, said forwardly sharpened upwardly inclining end portions of the blade cutting the material and imparting both a tangential and an upward velocity to the cut material, said housing deflecting the cut material around its internal surface, said blade having intermediate portions lying at least partly within the inner peripheral half of said internal surface of the housing, said intermediate portions of the blade inclining downward in a direction contrary to that of blade rotation for drawing cut material downward from the inner portion of said internal surface of said housing and into the path of the intermediate blade portions, said intermediate blade portions being forwardly sharpened for further cutting the cut material and mulching the terrain.

3. A combined material cutting and mulching mowing machine comprising a housing having a semitoroidal internal surface, the generatrix of said semitoroidal surface being substantially semi-circular, a blade, means mounting said blade for rotation about the major housing axis, and means for rotating said blade, said blade having forwardly sharpened end portions inclining upward in a direction contrary to the direction of blade rotation, said upwardly inclining end portions of the blade lying within the outer peripheral half of said internal surface of the housing, the effective cutting lengths of the upwardly inclining end portions of said blade lying outside the circular path of the generatrix of said semitoroidal surface of the housing, said forwardly sharpened upwardly inclining end portions of the blade cutting the material and imparting both a tangential and an upward velocity to the cut material, said housing deflecting the cut material around its internal surface, said blade having intermediate portions lying at least partly within the inner peripheral half of said internal surface of the housing, said intermediate portions of the blade inclining downward in a direction contrary to that of blade rotation for drawing cut material downward from the inner portion of said internal surface of said housing and into the path of the intermediate blade portions, said intermediate blade portions being forwardly sharpened for further cutting the cut material and mulching the terrain, the ratio of the radius of the path of the center of the generatrix of said semitoroidal surface to the radius of the generatrix itself being a value between 2 and 4.

4. A combined material cutting and mulching mowing machine comprising a housing having a semitoroidal internal surface, the generatrix of said semitoroidal surface being substantially semicircular, a blade, means mounting said blade for rotation about the major housing axis, and means for rotating said blade, said blade having forwardly sharpened end portions inclining upward in a direction contrary to the direction of blade rotation, said upwardly inclined end portions of the blade lying within the outer peripheral half of said internal surface of the housing, the effective cutting lengths of the upwardly inclining end portions of said blade being disposed outside the circular path of the generatrix of said semitoroidal surface of the housing, said forwardly sharpened upwardly inclining end portions of the blade cutting the material and imparting both a tangential and an upward velocity to the cut material, said housing deflecting the cut material around its internal surface, said blade having intermediate portions lying at least partly within the inner peripheral half of said internal surface of the housing, said intermediate portions of the blade inclining downward in a direction contrary to that of blade rotation for drawing cut material downward from the radially inner portion of the internal surface of said housing and into the path of the intermediate blade portions, said intermediate blade portions being forwardly sharpened for further cutting the cut material and mulching the terrain, the ratio of the radius of the path of the center of the generatrix of said semitoroidal surface to the radius of the generatrix itself having substantially the value of 2.5.

5. A combined material cutting and mulching mowing machine comprising a housing having a semitoroidal internal surface, a blade, means mounting said blade for rotation about the major housing axis, and means for rotating said blade, said blade having forwardly sharpened radially outer portions inclining upward in a direction contrary to the direction of blade rotation for providing cut material deflecting portions that impart both an upward and a tangential velocity to the cut material, said cut material deflecting portions of said blade lying outside the circular path of the center of the generatrix of said semitoroidal surface of the housing, said housing deflecting around its internal surface and downwardly adjacent the radially inner portion thereof the cut material received from said radially outer portions of the blade, said blade also having radially intermediate portions lying within the inner peripheral half of said internal surface of the housing, said intermediate portions of the blade being formed to provide an under surface that inclines downwardly in a direction contrary to that of blade rotation for generating a generally downwardly moving current of air that entrains cut material and carries the material downward from adjacent the radially inner portion of said semitoroidal housing to thereby bring the material into the path of the intermediate blade portions, said radially intermediate blade portions being forwardly sharpened for further cutting the previously cut material.

6. A mowing machine comprising a housing having a semitoroidal internal surface, the generatrix of said semitoroidal surface being substantially semicircular, a blade, means mounting said blade for rotation about the major housing axis, and means for rotating said blade, said blade having forwardly sharpened end portions inclining upward in a direction contrary to the direction of blade rotation, said forwardly sharpened upwardly inclining end portions of the blade cutting the material and imparting both a tangential and an upward velocity to the cut material, said housing deflecting the cut material around its internal surface, said blade having intermediate inclined sharpened portions lying within the inner peripheral half of said semitoroidal internal surface of the housing, said housing being proportioned so that the ratio of the radius of rotational path of the center of the generatrix of said semitoroidal surface to the radius of the semicircular arc of the generatrix itself has a numerical value between 2 and 4.

References Cited in the file of this patent
UNITED STATES PATENTS

| | | |
|---|---|---|
| 2,576,884 | Leigh | Nov. 27, 1951 |
| 2,578,880 | Doyle | Dec. 18, 1951 |
| 2,675,662 | Kroll | Apr. 20, 1954 |
| 2,718,739 | Long | Sept. 27, 1955 |
| 2,719,396 | Morris et al. | Oct. 4, 1955 |
| 2,799,985 | Rosenberg | July 23, 1957 |
| 2,802,327 | Thelander | Aug. 13, 1957 |
| 2,857,727 | Cole | Oct. 28, 1958 |
| 2,973,614 | Horner et al. | Mar. 7, 1961 |
| 3,003,298 | Wininger | Oct. 10, 1961 |